(12) United States Patent
Kimizuka et al.

(10) Patent No.: US 7,161,704 B1
(45) Date of Patent: Jan. 9, 2007

(54) IMAGE FORMATION APPARATUS

(75) Inventors: Junichi Kimizuka, Yokohama (JP);
Atsuko Adachi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 1134 days.

(21) Appl. No.: 09/697,499

(22) Filed: Oct. 27, 2000

(30) Foreign Application Priority Data

Nov. 4, 1999 (JP) .................................. 11-314123

(51) Int. Cl.
*G06K 15/02* (2006.01)

(52) U.S. Cl. ..................... 358/1.18; 358/443; 358/448; 358/530; 382/299

(58) Field of Classification Search ............... 358/1.18, 358/530, 448, 443; 382/299
See application file for complete search history.

(56) References Cited

U.S. PATENT DOCUMENTS

| | | | |
|---|---|---|---|
| 4,404,571 A | | 9/1983 | Kitamura .................... 346/108 |
| 5,140,349 A | * | 8/1992 | Abe et al. ................... 347/129 |
| 5,144,452 A | * | 9/1992 | Abuyama ................... 358/296 |
| 5,617,224 A | * | 4/1997 | Ichikawa et al. ........... 358/530 |
| 6,222,611 B1 | * | 4/2001 | Asada ......................... 355/35 |

FOREIGN PATENT DOCUMENTS

| | | |
|---|---|---|
| JP | 57-67375 | 4/1982 |
| JP | 2-226262 | 9/1990 |

* cited by examiner

*Primary Examiner*—Mark Zimmerman
*Assistant Examiner*—Jacob P. Rohwer
(74) *Attorney, Agent, or Firm*—Fitzpatrick, Cella, Harper & Scinto

(57) ABSTRACT

The image formation apparatus satisfies a user's demand to effectively use a sheet by writing an image to the marginal sheet edge, and prevents that toner is not transferred to the sheet but adhered to a transfer roller when the sheet is slightly misregistered from its accurate position, whereby back stain occurs in a next sheet. In this apparatus, an area in which the image is masked is changed by a CPU, according to an input mode of a image signal from an image signal generation unit. In a printer mode that the image signal is input from a host computer, image masking signals by which an image can be formed up to the sheet edge are given to gate circuits so as to expand the image up to the marginal sheet edge. In a mode that the image signal is input from an image reader, the image masking signals by which a margin can be provided at the sheet edge are given to the gate circuits so as to limit an image area.

20 Claims, 8 Drawing Sheets

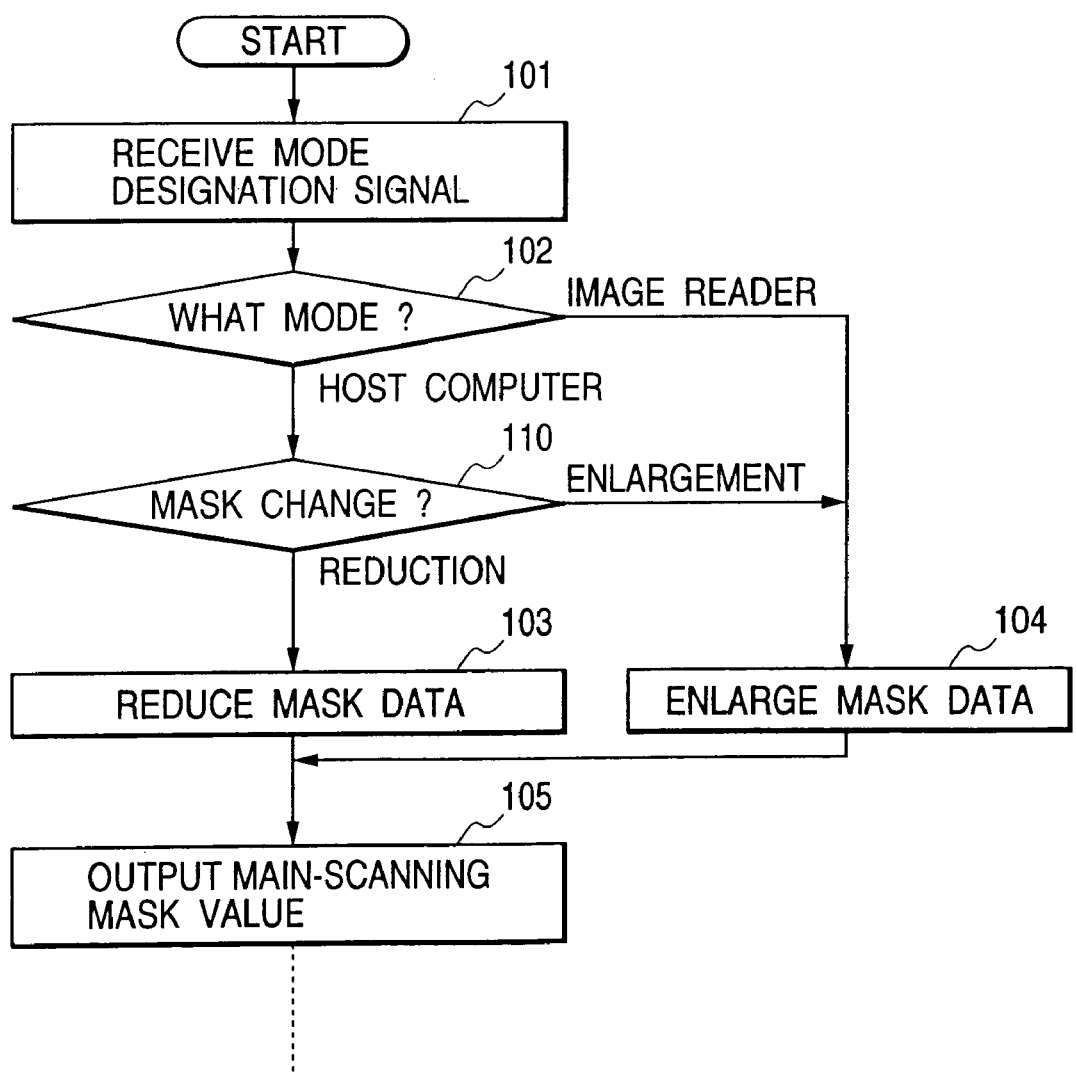

IMAGE FORMATION APPARATUS

BACKGROUND OF THE INVENTION

1. Field of the Invention

The present invention relates to an image formation apparatus which has an image masking control function for performing masking not to write an image in a non-image area, its image masking control method, and a recording medium in which an image masking control program has been recorded.

2. Related Background Art

Conventionally, an image formation apparatus such as an electrophotographic laser beam printer, a digital copying machine or the like has an image writing range which has been determined according to a sheet size. If image writing exceeds this image writing range, an image overreaches a sheet, toner adhered to the overreached part then adheres to a photosensitive drum, and the toner adhered to the drum further adheres to a transfer roller, whereby this roller is polluted. Such a state is explained in, e.g., Japanese Patent Application Laid-Open No. 2-226262 (referred as JPA '262 hereinafter) by the same assignee of the present application. However, JPA '262 merely describes that image overreaching in a sub-scanning direction, i.e., a sheet carrying direction, is prevented. For example, FIG. 2 of JPA '262 which is a timing chart of an enable signal ENBL represents that an image signal is passed only for a period of "true" of the signal ENBL by a signal masking an image signal VDO in the sub-scanning direction.

However, image overreaching occurs even in a main-scanning direction. If the image overreaching occurs in the main-scanning direction, the edge of a transfer roller 9 shown in FIG. 1 of JPA '262 is polluted by toner. When a next larger-sized sheet is fed, the toner adhered to the transfer roller 9 is then adhered to the back of the fed sheet, thereby causing a phenomenon called "a back stain". Especially, when printing is performed on both faces of the sheet, this back stain always causes serious image pollution.

In recent years, a user's demand to effectively use a sheet by writing an image to the marginal edge of the sheet becomes strong. For this reason, it is necessary to prevent, by performing image masking of high accuracy more than the past, an image writing overrun accurately at the marginal edge of the sheet if an image overreaches an image area on this sheet.

Further, a case where plural laser beams are used to write a color image is explained in, e.g., Japanese Patent Application Laid-Open No. 57-67375 by the same assignee of the present application. In this case, misregister (or deviation) of each beam makes accurate high-quality masking difficult.

Further, recently, a multifunctional information output apparatus called a multifunctional printer (MFP) has been in demand. In this MFP, an image scanner is incorporated with a printer, and an image read by the image scanner is output to the printer as it is. When an original is read by the image scanner, if its position is dislocated or its size is small, the periphery of this original is read as black. Thus, in a case where an image signal representing the black-periphery original is printed as it is, toner is not transferred to a sheet but is adhered to a transfer roller when a sheet position is slightly dislocated, thereby causing a back stain of a next sheet. Also, when the original is slightly dislocated, the black part on the periphery of the original is easily read by the image scanner.

SUMMARY OF THE INVENTION

A first object of the present invention is to solve such problems as above, i.e., to appropriately control an image masking area in both a case where an image area is expanded to the marginal edge of a sheet according to an image input to a printer and a case where an image area dares to be limited for self-protection of printing.

A second object of the present invention is to solve such the problems as above. Concretely, in a case where data from a host computer is expanded to an image signal for raster scanning and then printed, even if an image area is expanded to the marginal edge of a sheet, a problem is not caused easily, and thus a command to reduce a masking area is received. However, in a case where an image is input from an image reader, reception of a command to reduce a masking area is inhibited for self-protection of a printer.

In order to achieve the above objects, the present invention is characterized by providing an image formation apparatus which performs image formation by raster scanning, comprising:

a masking means for masking an image signal on the periphery of a screen in a main scanning direction and a sub scanning direction;

an input means for inputting the image signal;

a judgment means for judging an input mode of the image signal input by the input means; and a control means for changing an image masking range of the masking means, in accordance with a judged result of the judgment means.

Further, the present invention is characterized by providing an image formation apparatus which performs image formation by raster scanning, comprising:

a masking means for masking an image signal on the periphery of a screen in a main scanning direction and a sub scanning direction;

an input means for inputting the image signal;

a judgment means for judging an input mode of the image signal input by the input means; and a control means for inhibiting, in a mode that the image signal is input from an image reader, a change of an image masking range by the masking means, in accordance with a judged result of the judgment means.

Further, the present invention is characterized by providing an image masking control method for an image formation apparatus which performs image formation by raster scanning, the method comprising:

a masking step of masking an image signal on the periphery of a screen in a main scanning direction and a sub scanning direction;

an input step of inputting the image signal;

a judgment step of judging an input mode of the image signal input in the input step; and a control step of changing an image masking range in the masking step, in accordance with a judged result in the judgment step.

Further, the present invention is characterized by providing an image masking control method for an image formation apparatus which performs image formation by raster scanning, the method comprising:

a masking step of masking an image signal on the periphery of a screen in a main scanning direction and a sub scanning direction;

an input step of inputting the image signal;

a judgment step of judging an input mode of the image signal input in the input step; and a control step of inhibiting, in a mode that the image signal is input from an image reader, a change of an image masking range in the masking step, in accordance with a judged result in the judgment step.

Further, the present invention is characterized by providing a recording medium which has recorded an image masking control program for performing masking control of a computer to an image formation apparatus performing image formation by raster scanning, the image masking control program causing the computer:

to input an image signal;
to judge an input mode of the input image signal;
to change an image masking range in accordance with a judged result; and
to mask the image signal on the periphery of a screen in a main scanning direction and a sub scanning direction within the image masking range.

Further, the present invention is characterized by providing a recording medium which has recorded an image masking control program for performing masking control of a computer to an image formation apparatus performing image formation by raster scanning, the image masking control program causing the computer:

to input an image signal;
to judge an input mode of the input image signal;
to inhibit, in a mode that the image signal is input from an image reader, a change of an image masking range in accordance with a judged result; and
to mask the image signal on the periphery of a screen in a main scanning direction and a sub scanning direction.

Further, the present invention is characterized by providing an image formation apparatus comprising:

plural input means for inputting image data;
a recording means for recording an image on the basis of an image signal input by any of the plural input means;
a masking means for masking the image to be recorded by the recording means; and
a control means for controlling a masking area of the masking means, on the basis of by which of the plural input means the image data was input.

Further, the present invention is characterized by providing an image formation apparatus comprising:

a reading means for reading an original image;
a reception means for receiving an image signal from a host computer;
a recording means for recording an image on the basis of the image signal input by the reading means or the reception means;
a masking means for masking the image to be recorded by the recording means; and
a control means for controlling a masking area of the masking means, on the basis of by which of the reading means and the reception means the image signal was input.

Further, the present invention is characterized by providing an image masking control method comprising:

an input step of inputting an image from any of plural input means for inputting image data;
a masking step of masking the image to be recorded;
a masking control step of controlling a masking area in the masking step, on the basis of by which of the plural input means the image data was input; and
a recording step of recording the image on the basis of an image signal input from any of the plural input means in the input step.

Further, the present invention is characterized by providing an image masking control method comprising:

a reading step of reading an original image;
a reception step of receiving an image signal from a host computer;
a masking step of masking the image to be recorded;
a control step of controlling a masking area in the masking step, on the basis of by which of plural input means the image signal was input; and
a recording step of recording an image on the basis of the image signal input in the reading step or the reception step.

Further, the present invention is characterized by providing an image formation apparatus comprising:

a scanning means for scanning plural lasers;
an input means for inputting image data corresponding to the plural lasers; and
a generation means for generating a masking signal to control light emission of each of the plural lasers,
wherein the plural masking signals are generated by the generation means at mutually independent timing.

Further, the present invention is characterized by providing an image masking control method comprising:

a scanning step of scanning plural lasers;
an input step of inputting image data corresponding to the plural lasers; and
a generation step of generating a masking signal to control light emission of each of the plural lasers,
wherein the plural masking signals are generated in the generation step at mutually independent timing.

Other objects and features of the present invention will become apparent from the following detailed description and the attached drawings.

BRIEF DESCRIPTION OF THE DRAWINGS

FIG. 12 is a flow chart showing a control operation according to the second embodiment of the present invention.

DETAILED DESCRIPTION OF THE PREFERRED EMBODIMENTS

Hereinafter, the embodiments of the present invention will be explained in detail with reference to the attached drawings.

First Embodiment

Figure 2:
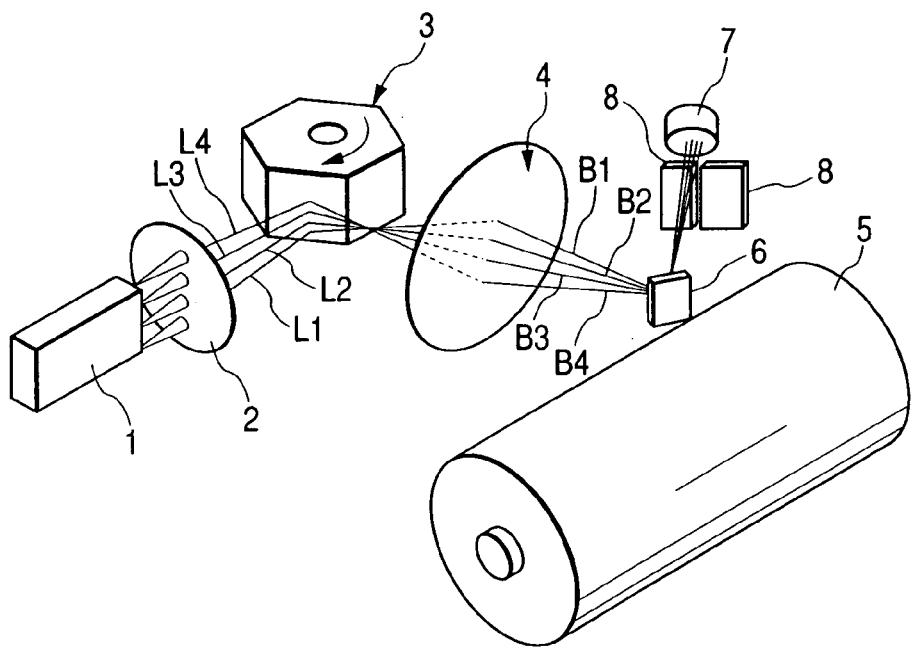
FIG. 2 is a perspective view showing a structure of a laser scanning optical system of the image formation apparatus according to the first embodiment of the present invention.

FIG. 2 shows a structure of a laser scanning optical system of an image formation apparatus according to the first embodiment of the present invention. In this drawing, numeral 1 denotes a multibeam laser which contains plural light emission sources. In the present embodiment, a four-beam laser is used by way of example. Laser beams which are emitted from the multibeam laser 1 are added with symbols L1, L2, L3 and L4 respectively. Numeral 2 denotes a collimator lens, numeral 3 denotes a polygonal mirror, numeral 4 denotes an F-θ lens, numeral 5 denotes a photosensitive drum which receives an image scanned by the laser, and numeral 6 denotes a reflection mirror. Numeral 7 denotes a beam detector (BD) which detects a main-scanning start timing, and numeral 8 denotes a slit member which constitutes a slit (i.e., a long and slender strap open). Beams which are condensed by the F-θ lens 4 are added with symbols B1, B2, B3 and B4 respectively.

The laser beams passed the collimator lens 2 are deflected by the polygonal mirror 3 toward the direction indicated by an arrow of FIG. 2, condensed by the F-θ lens 4, and then scanned on the photosensitive drum 5. A part of the laser beams condensed by the F-θ lens 4 is reflected at a main-scanning start position by the reflection mirror 6 and then guided to the beam detector 7.

Figure 3:
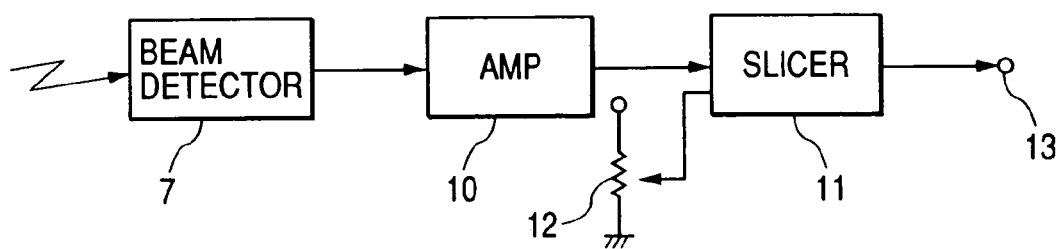
FIG. 3 is a block diagram showing a structure of a circuit for processing a signal received by a beam detector 7 of FIG. 2.

FIG. 3 shows a structure of a circuit which processes a signal received by the beam detector 7. In this drawing, numeral 10 denotes an amplifier which amplifies an electrical signal subjected to electrophotographic conversion by the beam detector 7. Numeral 11 denotes a slicer which slices an output signal of the amplifier 10 at a voltage set by a variable resistor 12 to generate a square-wave pulse. Then the square-wave pulse is output to a terminal 13.

Figure 4:
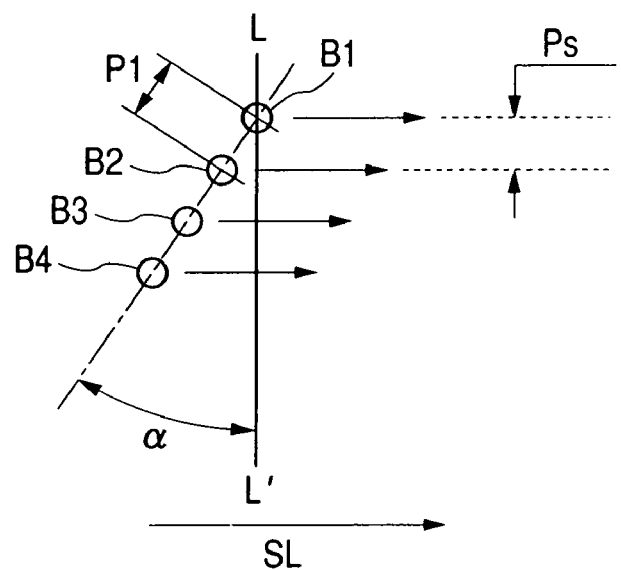
FIG. 4 is a diagram showing an inclination of multibeams of FIG. 2.

FIG. 4 shows is a diagram showing an inclination of the multibeams B1, B2, B3 and B4 which are condensed by the F-θ lens 4. A line which is perpendicular to a main-scanning line SL is defined as a line L–L'. Each beam interval of the four multibeams B1, B2, B3 and B4 is assumed to be P1. In this situation, when the inclination of the multibeams is set to be an angle α from the line L–L', a scanning line interval on the photosensitive drum 5 can be set to be Ps which is narrower than the interval P1.

However, when the multibeams are inclined as above, timing at which each beam starts the main scanning becomes different. On the photosensitive drum 5, such a timing deviation is about 0.5 mm between the adjacent beams. Therefore, when the image is written, it is necessary to correct such the timing deviation.

On the other hand, the generation of the masking signal for limiting an image writing range need not be corrected severely as compared with the image writing. In the range of a sheet-edge margin (ordinarily 3 mm or so), even if masking is not performed for each beam, it is possible to generate the masking signals for the respective beams in a mass. However, in a case where it is intended to write the image to the marginal edge of the sheet, it is necessary to eliminate or remove the margin, whereby the above timing between the adjacent beams causes a problem. Thus, it is necessary to accurately perform the image masking for each beam.

Figure 5:
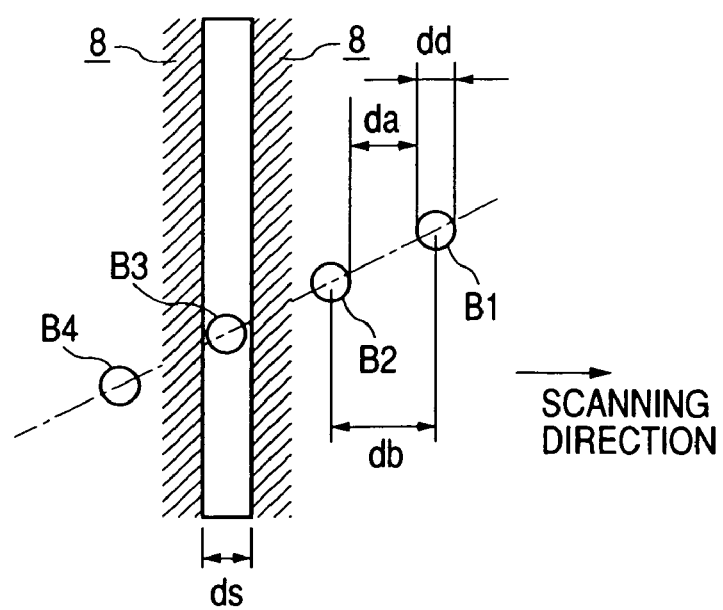
FIG. 5 is a diagram showing a state that each beam passes a slit member 8 of FIG. 2.

FIG. 5 shows a state that each beam passes the slit member 8 of FIG. 2. Here, a beam diameter, a slit interval, an interval (or a distance) between the centers of the adjacent beams, and an interval (or a distance) between the adjacent beams are assumed to be dd, ds, db and da, respectively. When the slit interval ds is set to be larger than the beam diameter dd and sufficiently narrower than the interval da, it is possible to separate each beam passed the slit member 8 from others and guide the separated beam to the beam detector 7.

Figure 6:
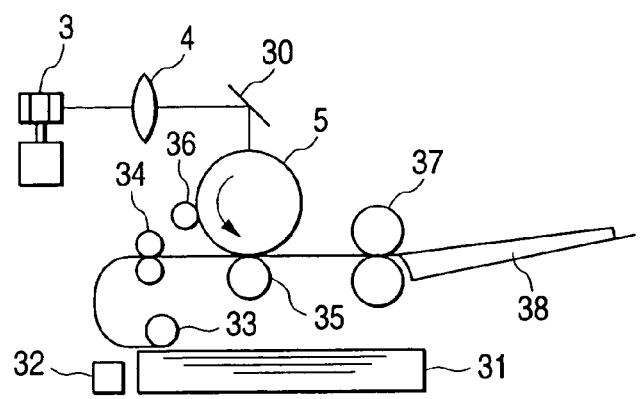
FIG. 6 is a sectional diagram showing a structure of the main part of the image formation apparatus according to the first embodiment of the present invention.

FIG. 6 shows a structure of the main part of the image formation apparatus according to the present embodiment. In this diagram, a folding mirror 30 is added to the optical system. Numeral 31 denotes a sheet feed cassette, and numeral 32 denotes a sheet size sensor. The sheet size sensor 32 reads information of a projection which is provided on the cassette 31 and corresponds to a sheet size, as bit information by using a microswitch or the like. Numeral 33 denotes a sheet feed roller, numeral 34 denotes a register roller, numeral 35 denotes a transfer roller, numeral 36 denotes a development roller, numeral 37 denotes a fixing roller, and numeral 38 denotes a sheet discharge tray.

The beam which was scanned by the polygonal mirror 3 and condensed by the F-θ lens 4 is folded by the folding mirror 30 and irradiated on the photosensitive drum 5, whereby a latent image is formed on the photosensitive drum 5. In synchronism with such an operation, a sheet held in the sheet feed cassette 31 is fed one by one by the sheet feed roller 33, sheet feed timing is adjusted by the register roller 34, and then the fed sheet is carried to the photosensitive drum 5. The latent image on the drum 5 is developed by the development roller 36, a toner image obtained by the development is transferred on the sheet by the transfer roller 35, and the sheet is then passed the fixing roller 37, whereby the toner image is heated and pressed. Then the sheet is discharged to the sheet discharge roller tray 38.

Figure 1:
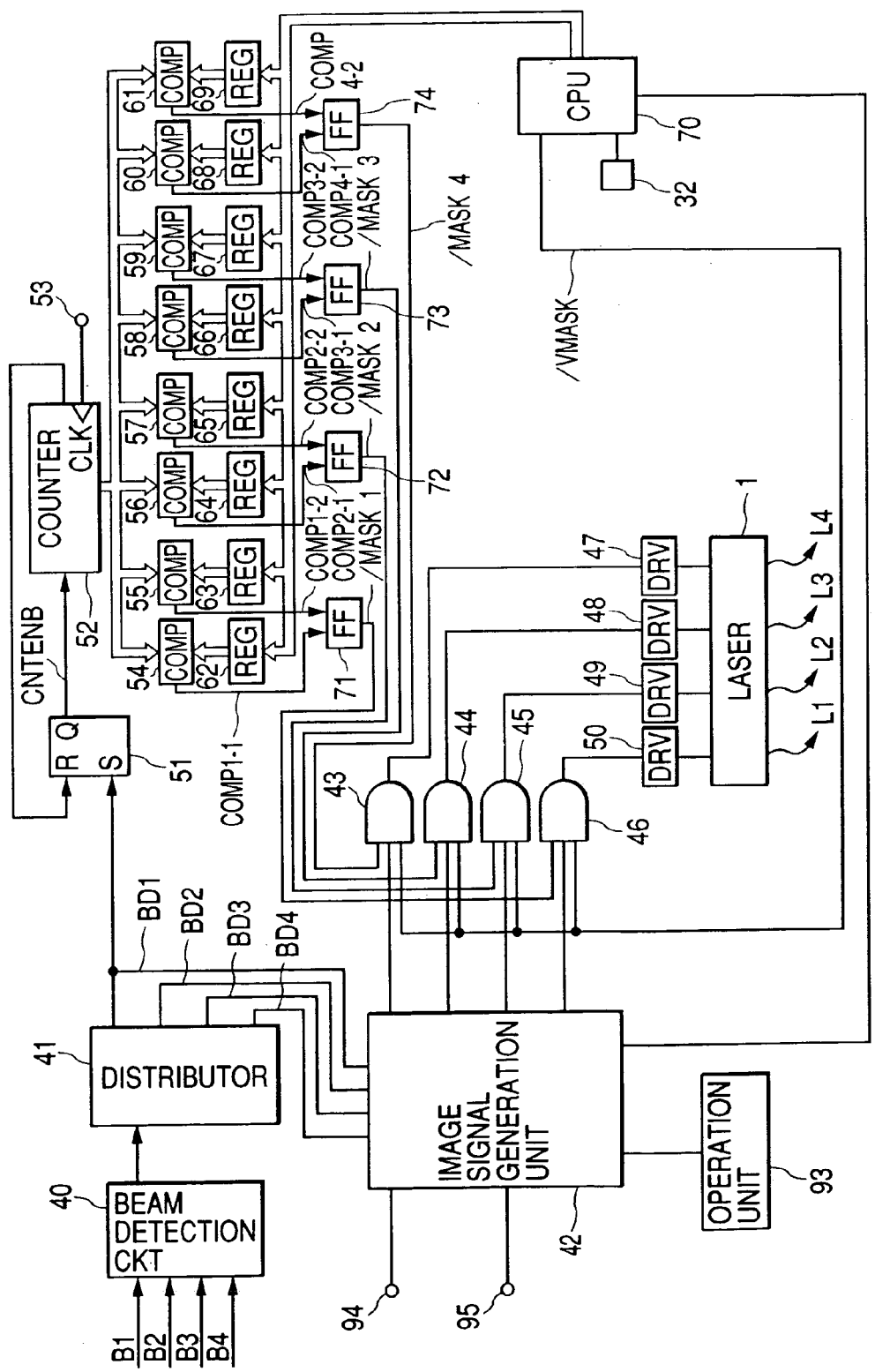
FIG. 1 is a block diagram showing a circuit structure of a control system of an image formation apparatus according to the first embodiment of the present invention.

FIG. 1 shows a circuit structure of a control system of the image formation apparatus according to the first embodiment of the present invention. In this diagram, numeral 40 denotes a beam detection circuit, numeral 41 denotes a distributor, and numeral 42 denotes an image signal generation unit. The beam detection circuit 40 contains the circuit of FIG. 3 entirely. When the four beams B1 to B4 are input to the beam detector 7, a detection signal having four pulses is output, and the output signal is divided into the four pulses by the distributor 41.

A main-scanning start timing signals which are divided by the distributor 41 are added with symbols BD1, BD2, BD3 and BD4 respectively. When the main scanning is started, the signal BD1 is first detected. The signals BD1 to BD4 are transferred to the image signal generation unit 42 to generate an image signal corresponding to each scanning line. Numerals 94 and 95 denote connection terminals of the image signal generation unit 42. The connection terminal 94 is connected to a host computer (not shown) which is one of image data generation sources, and the connection terminal 95 is connected to an image reader (not shown) which is the other of the image data generation sources.

Figure 7:
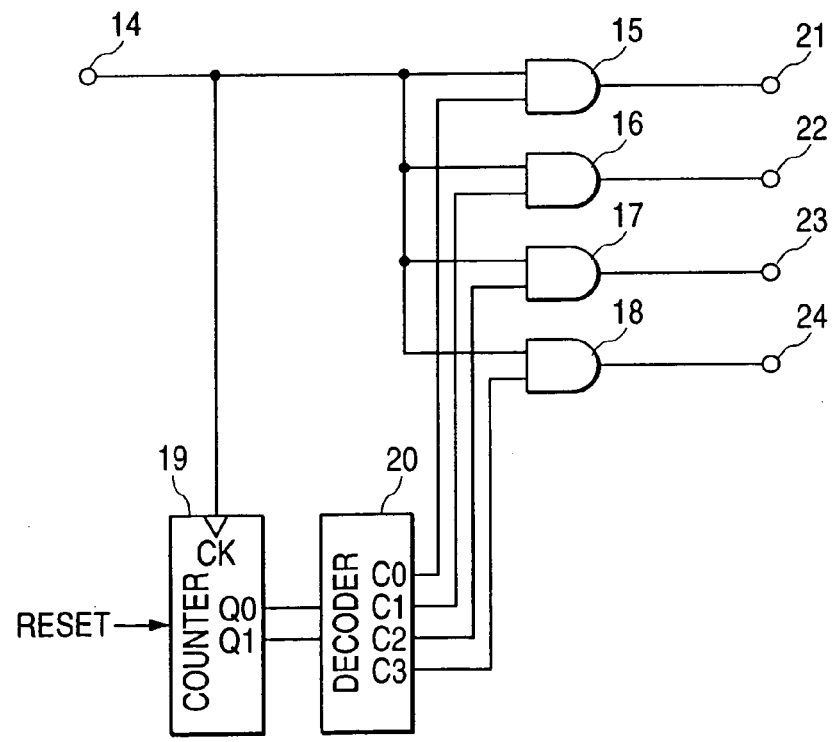
FIG. 7 is a block diagram showing a content of a distributor 41 of FIG. 1.

The content of the distributor 41 is shown in FIG. 7. A pulse signal which is output from the terminal 13 of the detection circuit 40 is applied to a terminal 14 of FIG. 7. In FIG. 7, numerals 15, 16, 17 and 18 denote gate circuits, numeral 19 denotes a four-value counter, and numeral 20 denotes a decoder. Numerals 21, 22, 23 and 24 denote output terminals of the separated signals BD1, BD2, BD3 and BD4 respectively.

Figure 8:
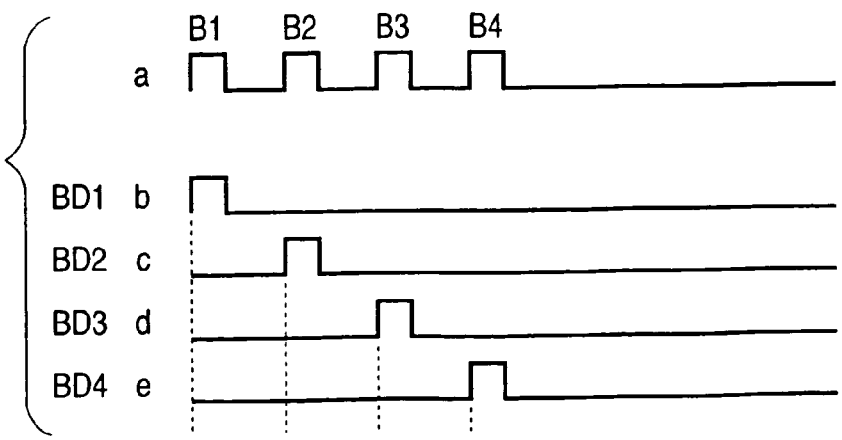
FIG. 8 is a timing chart showing timing of input and output signals of the distributor 41 of FIG. 7.

FIG. 8 is a timing chart showing timing of input and output signals of the distributor 41 of FIG. 7. In these diagrams, a pulse wave of a timing signal a represents the BD detection signals B1 to B4 having four pulses applied to the terminal 14. Every time each pulse is applied, the counter 19 makes a count. When the output of the counter 19 is decoded by the decoder 20, signals corresponding to the output of the counter 19 are given at output parts C0, C1, C2 and C3 of the decoder 20. Then, when the output signals of the decoder 20 are transferred to the gate circuits 15 to 18 respectively, timing signals b, c, d and e of FIG. 8 respectively corresponding to the separated signals BD1, BD2, BD3 and BD4 can be obtained.

FIG. 1 will be again explained. In this diagram, numerals 43, 44, 45 and 46 denote gate circuits (AND circuits) respectively. The image signals passed these gate circuits 43 to 46 are applied to respective beam generation units (e.g., a not-shown laser diodes) of the multibeam laser 1 through laser drivers (DRV's) 47, 48, 49 and 50 respectively. Thus, the multibeam laser 1 outputs the laser beams L1 to L4 which are blinked according to the image signal.

Next, a masking process of an image main-scanning direction will be explained with reference to FIG. 1. In FIG. 1, numeral 51 denotes a flip-flop, numeral 52 denotes a counter, and numeral 53 denotes a clock input terminal of the counter 52. Numerals 54, 55, 56, 57, 58, 59, 60 and 61 denote digital comparators which perform comparison for the outputs of the counter 52. Numerals 62, 63, 64, 65, 66, 67, 68 and 69 denote registers, and numeral 70 denotes a CPU (central processing unit) which controls the masking process. A value is loaded from the CPU 70 to each register. Numerals 71, 72, 73 and 74 denote flip-flops (FF's) respectively.

Figure 9:
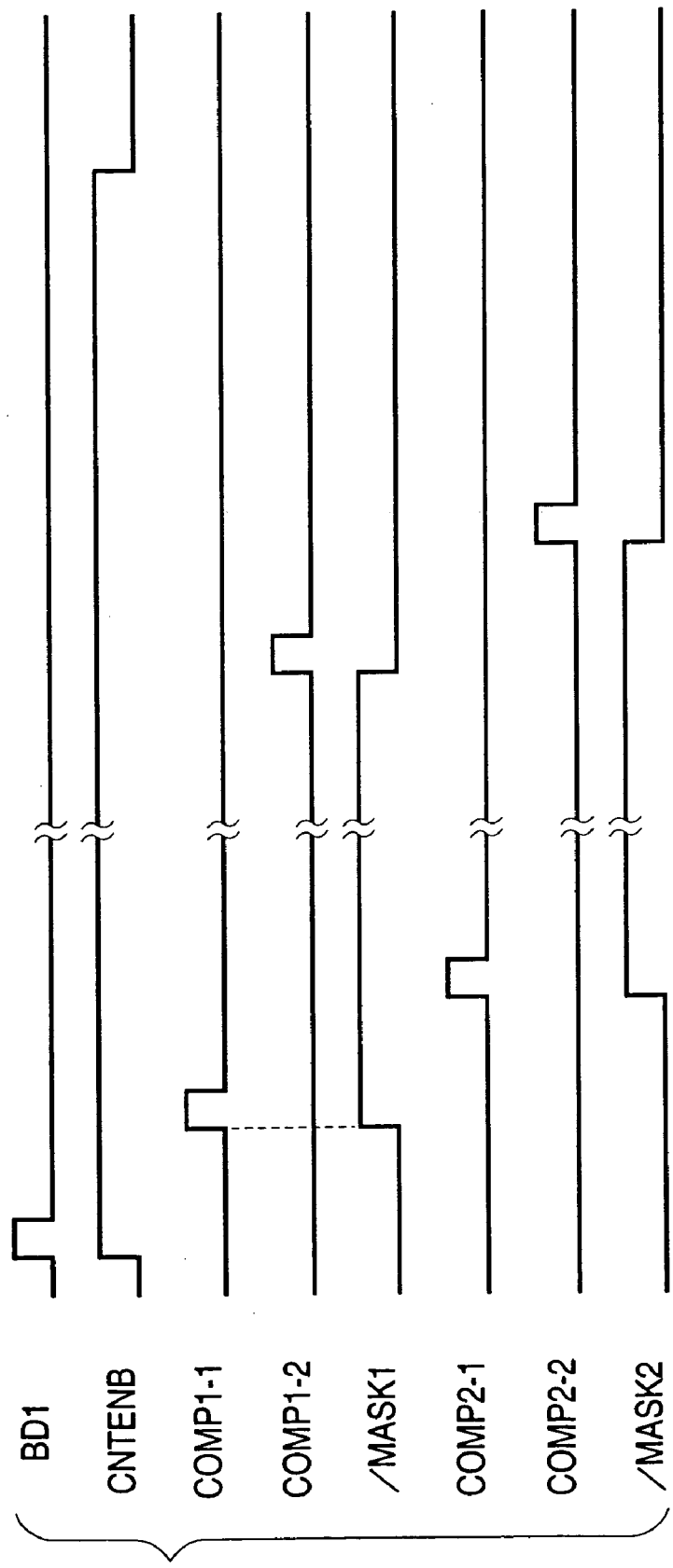
FIG. 9 is a timing chart showing timing of signals in the circuit of FIG. 1.

These parts 51 to 74 constitute the unit which generates the image masking signal. A timing chart of this unit is shown in FIG. 9, and an operation of the image masking will be explained with reference to FIG. 9. However, for simplification of the explanation, a method in which only the signal BD1 is used as the beam detection signal will be explained hereinafter.

Ordinarily, the distributor 41 is often incorporated in the image signal generation unit 42 because of the following reason. Namely, the image signal generation unit 42 occupies comparatively a large capacity in the image formation apparatus, and a radiation noise is easily generated from this unit 42, whereby this unit 42 is often disposed at the position partitioned by an independent shield case (not shown) in the image formation apparatus. When the beam detection signals BD1 to BD4 are transferred up to this position of the shield case, a delay between the adjacent beams might become a problem. Thus, the four beam detection signals are transferred to the image signal generation unit 42 like a settled pulse, and the transferred settled pulse is then divided into the respective pulses. By doing so, it is possible to more effectively reduce the difference of the individual delay. This is the reason why the distributor 41 is often incorporated in the image signal generation unit 42.

First, the beam detection signal BD1 from the distributor 41 is applied to an set terminal S of the flip-flop 51. Then, an operation enable signal CNTENB is output from a terminal Q of the flip-flop 51 to the counter 52, whereby counting of a clock applied to the clock terminal 53 is started by the counter 52.

A maximum value output of the counter 52 is returned to a reset terminal R of the flip-flop 51 to reset the flip-flop 51, whereby the level of the signal CNTENB becomes low. Namely, the counter 52 operates while the level of the signal CNTENB is being high. After the counter 52 outputs the maximum value, it returns to an initial state (i.e., zero-count state).

In the above, the example that only the beam detection signal BD1 is extracted by using the distributor 41 was explained. On the other hand, when the set terminal S of the flip-flop 51 is once triggered and then set, the output at the terminal Q does not change until a reset signal is input to the reset terminal R. Thus, even if the output of the detection circuit 40 is directly added to the flip-flop 51 without the distributor 41, the effect obtained is the same.

Next, how to obtain the output from the counter 52 will be explained. The output from the counter 52 is compared with the outputs from the registers 62 to 69 to which data (value) is set by the CPU 70, by the respective digital comparators 54 to 61. When coincidence is obtained in such the comparison, output signals are generated from the digital comparators 54 to 61. These output signals are shown as signals COMP-1, COMP1-2, COMP2-1 and COMP2-2 in FIG. 9. The outputs from the digital comparators 54 to 61 are applied to the corresponding flip-flops 71 to 74.

Namely, the comparator signals COMP1-1 and COMP1-2 from the digital comparators 54 and 55 are applied to the flip-flop 71, the comparator signals COMP2-1 and COMP2-2 from the digital comparators 56 and 57 are applied to the flip-flop 72, comparator signals COMP3-1 and COMP3-2 from the digital comparators 58 and 59 are applied to the flip-flop 73, and comparator signals COMP4-1 and COMP4-2 from the digital comparators 60 and 61 are applied to the flip-flop 74. It should be notified that, for simplification, only signal waveforms of the two beams are shown and signal waveforms of other beams are omitted.

By the comparator signals applied to the flip-flops 71 to 74, masking signals /MASK1 and /MASK2 shown in FIG. 9 are obtained from the flip-flop outputs. Although there are phase deviations, masking signals /MASK3 and /MASK4 are obtained similarly. It should be noted that the symbol "/" represents that the level of the signal in question is low and its signal function is available. Namely, the masking signal /MASK1 represents that the image is masked when the level of this signal is low, and that the image signal passes the gate circuits 43 to 46 when the level is high. Therefore, these gate circuits 43 to 46 correspond to a masking means for the image signal.

On/off timing and widths of the masking signals /MASK1, /MASK2, /MASK3 and /MASK4 can be changed on the basis of the data loaded from the CPU 70 to the registers 62 to 69. The CPU 70 detects a sheet size on the basis of the detection signal sent from the sheet size sensor 32 (FIG. 6), and then loads the data according to the detected size to the registers 62 to 69.

Further, the signal loaded from the CPU 70 to the registers 62 to 69 adds a value corresponding to a positional misregister (deviation) of each beam (i.e., the value corresponding to the distance db between the centers of the adjacent beams in FIG. 5) so as to correct such the positional misregister of each beam. It should be noted that such the positional misregister can be corrected in more detail by separately giving an adjustment value to the CPU 70.

As above, it is possible to generate the accurate image masking signal in the main scanning direction in correspondence with each beam.

It should be noted that the counter 52 can be also used for generation of an unblanking signal and observation of a BD signal period, in addition to the generation of the masking signal.

The image signal generation unit 42 has the connection terminal 94 to which a signal from the host computer (not shown) is input. The image signal generation unit 42 expands the signal received from the host computer to the image signal so as to be able to form an image by raster scanning on the photosensitive drum 5.

The image signal generation unit 42 has the other connection terminal 95 to which a signal from the image reader (not shown) is input. The signal from the image reader passes the image signal generation unit 42 as it is. An operation unit 93 is connected to the image signal generation unit 42. It is possible by the operation unit 93 to select and designate whether the image formation apparatus executes a mode to print the data from the host computer or a mode to print the image signal from the image reader. When one of these modes is designated by the operation unit 93, a corresponding mode designation signal is transferred from the image signal generation unit 42 to the CPU 70.

It was explained that the CPU 70 outputs the image masking timing data of the main scanning direction according to the detection signal from the sheet size sensor 32. Further, the CPU 70 outputs an image masking signal /VMASK of the sub scanning direction. Although this signal /VMASK is substantially the same as the enable signal ENBL described in FIG. 2 of JPA '262 and represented as the image masking signal, the polarity of this signal /VMASK is opposite to that of the signal ENBL. Namely, when the level of the signal /VMASK is low, the laser is not permitted to generate a beam for image signal writing. The image masking signal /VMASK is applied to the gate circuits 43 to 46, and the image signal from the image signal generation unit 42 is stopped when the level of this signal /VMASK is low.

Figure 10:
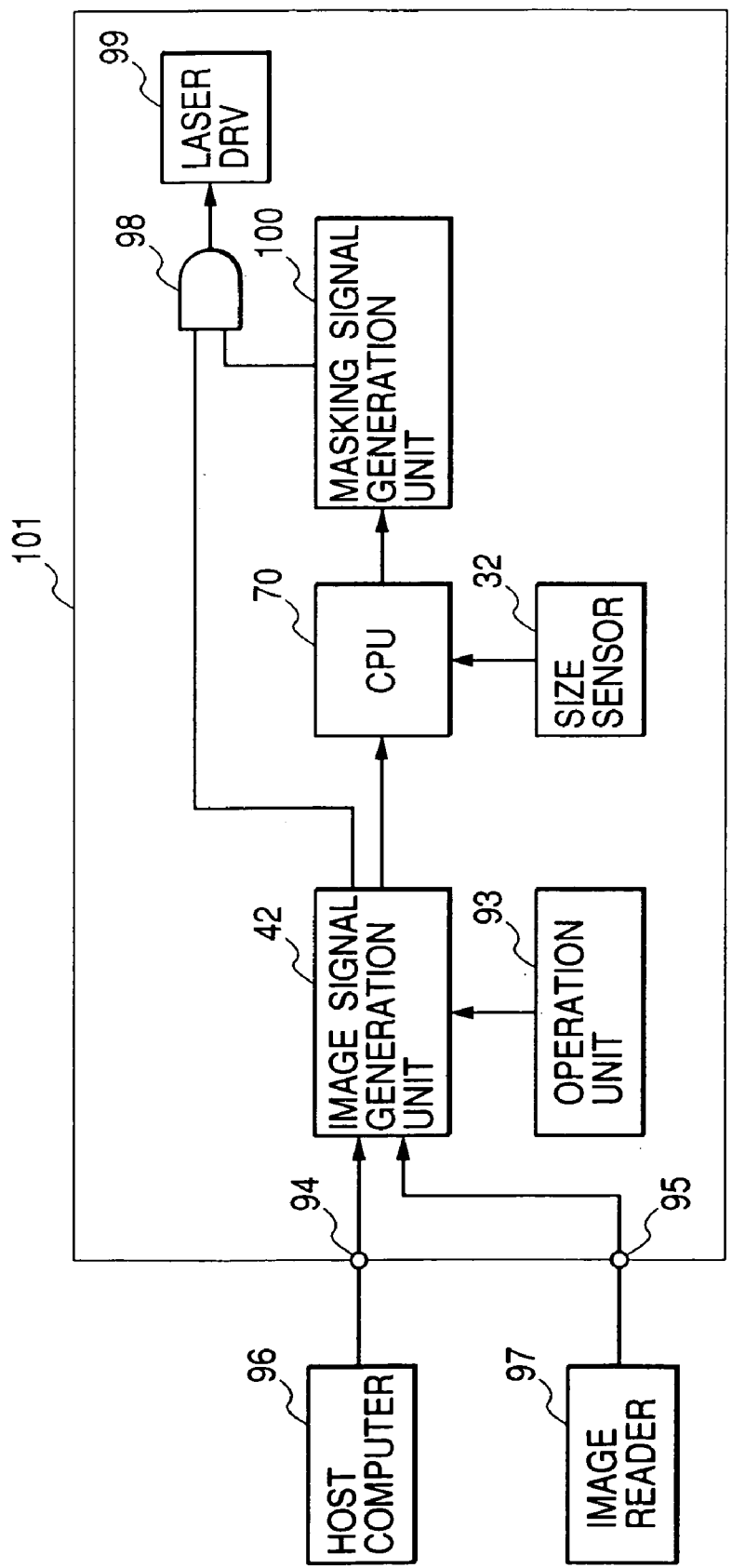
FIG. 10 is a block diagram showing a structure of an entire system according to the first embodiment of the present invention.

FIG. 10 shows a structure of an entire system according to the first embodiment of the present invention. In this diagram, numeral 101 denotes the entirety of the image formation apparatus, numeral 96 denotes a host computer which is connected to the connection terminal 94, and numeral 97 denotes an image reader which is connected to the connection terminal 95. Numeral 98 denotes an aggregation of the gate circuits 43 to 46 of FIG. 1, and numeral 99 denotes an aggregation block of the laser drivers 47 to 50 and the laser 1 of FIG. 1. Numeral 100 denotes a masking signal generation unit which is an aggregation of the counter 52 and its peripheral logical circuits 54 to 74 of FIG. 1. FIG. 10 shows the relation of the image formation apparatus 100, the host computer 96 and the image reader 97.

Figure 11:
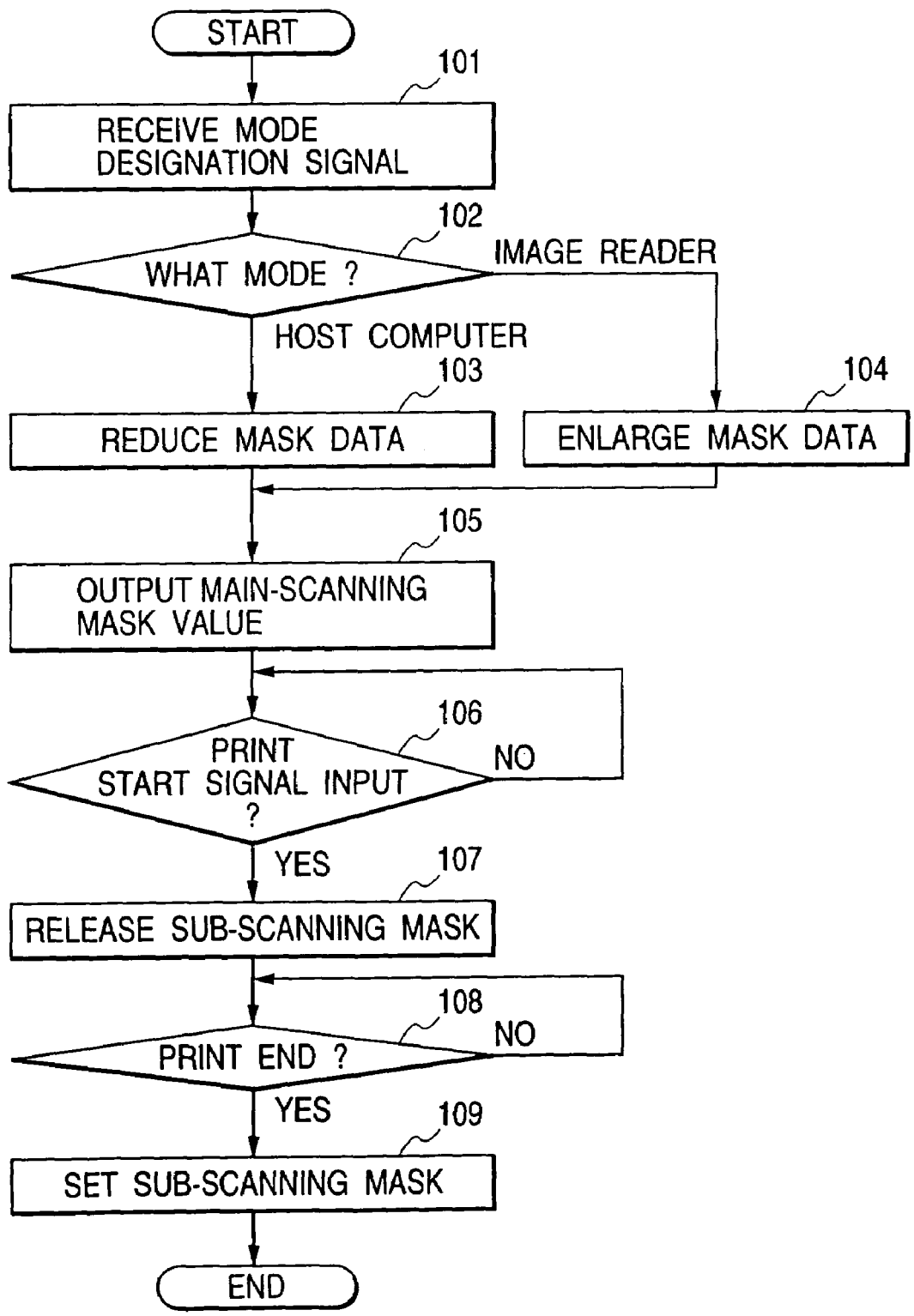
FIG. 11 is a flow chart showing a control operation of a CPU 70 of FIG. 1 according to the first embodiment of the present invention.

Next, a process operation which is performed by the CPU 70 when it receives the mode designation signal from the image signal generation unit 42 will be explained with reference to a flow chart of FIG. 11.

First, in a step 101, the image input mode designation signal is received from the image signal generation unit 42. Then, in a step 102, it is judged whether the designated mode is to designate data image input from the host computer 96 or the image reader 97. If judged that the designated mode is to designate the data input from the host computer 96, then in a step 103 on/off timing data of the image masking signal which accords to the sheet size sent from the sheet size sensor 32 and by which the image masking area of the main scanning direction is reduced as much as possible (i.e., the image masking signal by which the image can be formed up to the sheet edge) is loaded to an internal memory (not shown) of the CPU 70.

Further, the signal which is loaded to the internal memory of the CPU 70 adds a value corresponding to the positional misregister (deviation) of each beam (i.e., the value corresponding to the distance db between the centers of the adjacent beams in FIG. 5) so as to correct such the positional misregister of each beam. Further, on/off timing data of the image masking signal which accords to the sheet size and which the image masking area of the sub scanning direction is reduced is loaded to the internal memory of the CPU 70.

On the other hand, if judged in the step 102 that the designated mode is to designate the data input from the image reader 97, then in a step 104 on/off timing data of the enlarged image masking signals of the main and sub scanning directions which accord to the sheet size sent from the sheet size sensor 32 (i.e., the image masking signal by which the sheet-edge margin can be provided) is loaded to the internal memory of the CPU 70.

Next, in a step 105, the data of the masking signal of the main scanning direction is loaded to the registers 62 to 69.

Subsequently, in a step 106, it is judged whether or not a print start signal is input from the image signal generation unit 42. If judged that the print start signal is input, the flow advances to a step 107 to set the level of the image masking signal /VMASK to be high in order to release the image masking in the sub scanning direction. Thus, the image signal can pass the gates 43 to 46. As described above, it should be noted that, for the main scanning direction, the image masking is performed by the operation of the counter 52 through the logical circuits 54 to 74.

Next, in a step 108, it is judged whether or not print end timing is given. A timer (not shown) started at the print start time performs time counting and then stands a flag when a time corresponding to the sheet size elapses. Thus, the above print end timing can be known from such the flag.

When the print end timing is given, the flow advances to a step 109 to set the level of the image masking signal /VMASK to be low in order to perform the image masking in the sub scanning direction. Thus, the gates 43 to 46 are closed.

Thus, the image signal is subjected to the masking in the main and sub scanning directions according to the sheet size and the image input mode.

In the present embodiment, the case where the scanning is performed by using the multibeams was explained. However, the present invention is of course applicable to a case where the scanning is performed by using a single beam. Further, in the present embodiment, a laser beam printer was used as the printer. However, the present invention is not limited to this. For example, the present invention is similarly applicable to a light emission diode array printer.

Second Embodiment

FIG. 12 is a flow chart showing a control operation according to the second embodiment of the present invention. It should be noted that, since the latter half of this flow chart is the same as that of FIG. 11 in the first embodiment, the explanation thereof will be omitted. Further, it should be noted that, since the hardware structure of the second embodiment is the same as that of the first embodiment, the explanation thereof will be omitted.

In the first embodiment, the image masking range is enlarged and reduced according to the image input mode. However, in the second embodiment, it is prevented by image masking that the inside of an image formation apparatus is polluted by toner overreaching an image formation area.

For this reason, in the second embodiment, the image input mode designation signal is received from the image signal generation unit 42 in a step 101. Then, if it is judged in a step 102 that the designated mode is to designate data image input from the host computer 96, then in a step 110 it is judged whether or not a command to reduce the image masking area has been issued from the operation unit 93 or the host computer 96. Then, only when the command to reduce the image masking area is issued, the masking area is reduced in a step 103 such that the image can be written to the marginal edge of the sheet.

On the other hand, in ordinary use, it gives priority to a margin being formed at the sheet edge. Namely, if it is judged in the step 102 that the designated mode is to designate data image input from the image reader 97, and if it is judged in the step 110 that the command to reduce the image masking area is not issued from the operation unit 93 or the host computer 96, then in a step 104 on/off timing data of the enlarged image masking signals of the main and sub scanning directions which accord to the sheet size sent from the sheet size sensor 32 (i.e., the image masking signal by which the sheet-edge margin can be provided) is loaded to the internal memory of the CPU 70.

The operations in a step 105 and following steps are the same as those in the corresponding steps of the first embodiment.

OTHER EMBODIMENTS

In the above embodiments, the example that the four laser beams are used was explained. However, the present invention is not limited to the number of the laser beams.

Further, in the above embodiments, the operation that, when the masking signal is generated, all of the four beams B1 to B4 are detected and the beam detection signals BD1 to BD4 are then generated respectively based on the detected beams B1 to B4 was explained. However, it is possible to first detect only the beam B1 and then generate the beam detection signal BD1 based on the detected beam B1 such that the beam detection signals BD2 to BD4 delayed from the signal BD1 at a predetermined time are generated.

Further, the present invention is applicable to a system structured by plural equipments (e.g., a host computer, an interface device, a reader, a printer, and the like) or to an apparatus structured by one equipment (e.g., a copying machine, a fax machine, or the like).

Further, it is needless to say that the object of the present invention can be attained in a case where a recording medium (or a storage medium) recording program codes to realize the functions of the above embodiments is supplied to the system or the apparatus, and a computer (or CPU or MPU) in this system or apparatus reads and executes the stored program codes.

In this case, the program codes themselves read from the recording medium execute the functions of the above embodiments, whereby the recording medium recording the program codes constitutes the present invention.

As the recording medium recording the program codes, for example, it is possible to use a floppy disk (FD), a hard disk, an optical disk, a magnetooptical disk, a CD-ROM, a CD-R, a magnetic tape, a non-volatile memory card (IC memory card), various ROM's (a masking ROM, a flash EEPROM, etc.), or the like.

Further, it is needless to say that the present invention includes not only the case where the functions of the above embodiments can be executed by performing the program codes read by the computer, but also a case where an OS (operating system) or the like running on the computer executes a part or all of the actual process based on instructions of the program codes and the functions of the above embodiments can be executed by such the process.

As explained above, according to the embodiments, the area in which the image is masked is changed according to the input mode of the image signal. Namely, in the printer mode that the image signal is input from the host computer apparatus, it expands the image to the marginal sheet edge, while in the mode that the image signal is input from the image reader, it dares to limit the image area for self-protection of the printer. Therefore, the user's demand to effectively use the sheet by writing the image to the marginal sheet edge can be satisfied. Further, in the case where the image signal obtained when the periphery of the original was read to be black is printed as it is, if the sheet is slightly misregistered from its accurate position, the toner is not transferred to the sheet but adhered to the transfer roller, whereby the back stain occurs in the next sheet. However, according to the embodiments, such the drawback can be prevented.

Although the present invention has been explained by using the several preferred embodiments, the present invention is not limited to them. Namely, it is obvious that various modifications and changes are possible in the present invention without departing from the spirit and scope of the appended claims.

What is claimed is:

1. An image formation apparatus comprising:
   a recording unit adapted to provide a first mode for recording an image based on an image data input from a first input device, and a second mode for recording an image based on an image data input from a second input device;
   a masking unit adapted to mask the image to be recorded by said recording unit, so as to provide a sheet-edge margin; and
   a control unit adapted to variably control a size of a masking area of a sheet-edge margin, based at least in part on a selected mode of said recording unit.

2. An apparatus according to claim 1, wherein said plural input units include at least a reading unit adapted to read an original image, and a reception unit adapted to receive the image data from a host computer.

3. An apparatus according to claim 2, wherein said control unit expands an image area up to the vicinity of a sheet edge by reducing the masking area of said masking unit when the image is recorded based on the image signal from said reception unit.

4. An apparatus according to claim 3, further comprising a permitting unit adapted to permit said control unit to reduce the masking area when the image is recorded based on the image signal input from said reception unit, and adapted to inhibit said control unit from reducing the masking area when the image is recorded based on the image data read by said reading unit.

5. An image formation apparatus comprising:
   a reading unit adapted to read an original image;
   a reception unit adapted to receive an image signal from a host computer;
   a recording unit adapted to provide a first mode for recording an image based on an image data input from said reading unit, and a second mode for recording an image based on an image data input from said reception unit;

a masking unit adapted to mask the image to be recorded by said recording unit, so as to provide a sheet-edge margin; and a control unit adapted to variably control a size of a masking area of a sheet-edge margin, based at least in part on a selected mode of said recording unit.

6. An apparatus according to claim 5, further comprising:

a masking control unit adapted to control, in order to expand an image area up to the vicinity of a sheet edge, said masking unit to reduce the masking area on the basis of reception of a command to reduce the masking area of said masking unit; and a permitting unit adapted to permit the reduction of the masking area only when the image is recorded based on image data input by said reception unit.

7. An apparatus according to claim 5, wherein said masking unit comprises a masking signal generation unit adapted to generate a masking signal, and a logical calculation unit adapted to perform logical calculation to the image signal and the masking signal generated by said masking signal generation unit.

8. An apparatus according to claim 5, wherein said recording unit comprises a semiconductor laser, a scanning unit adapted to scan a laser beam generated by said semiconductor laser, and a detection unit adapted to detect the laser beam scanned by said scanning unit.

9. An apparatus according to claim 8, wherein said masking unit masks the laser beam in a main scanning direction and a sub scanning directions of the laser beam.

10. An apparatus according to claim 8, wherein said masking unit controls masking in a main scanning direction on the basis of a detection signal of said detection unit.

11. An image masking control method comprising:

a masking step of masking an image input from any of plural input units so as to provide a sheet-edge margin;

a masking control step of variably controlling the size of a masking area of a sheet-edge margin; and a recording step of providing a first mode for recording an image based on an image data input from a first input device, and a second mode for recording an image based on an image data input from a second input device, wherein in said masking control step, the size of the masking area of the sheet-edge margin is based at least in part on a selected mode of said recording step.

12. A method according to claim 11, wherein the plural input units include at least a reading unit adapted to read an original image, and a reception unit adapted to receive the image data from a host computer.

13. A method according to claim 12, wherein, in said masking step, when the image is recorded based on the image signal from the reception unit, an image area is expanded up to the vicinity of a sheet edge by reducing the masking area in said masking step.

14. A method according to claim 13, wherein it is permitted to reduce the masking area when the image is recorded based on the image signal input from the reception unit, and it is inhibited to reduce the masking area when the image is recorded based on the image data read by the reading unit.

15. An image masking control method comprising:

reading step of reading an original image;

a reception step of receiving an image signal from a host computer;

a masking step of masking the image so as to provide a sheet-edge margin;

a control step adapted to variably control a size of a masking amount of a sheet-edge margin; and a recording step of providing a first mode for recording an image based on an image data input from a first input device, and a second mode for recoding an image based on an image data input from a second input device, wherein in said control step, the size of the masking area of the sheet-edge margin is a base based at least in part on a selected mode of said recording step.

16. A method according to claim 15, further comprising a masking control step adapted to control, in order to expand an image area up to the vicinity of a sheet edge, masking control to reduce the masking amount on the basis of reception of a command to reduce the masking amount, wherein it is permitted in said masking control step to reduce the masking area only when the image is recorded based on image data input in said reception step.

17. A method according to claim 15, wherein said masking step comprises a masking signal generation unit adapted to generate a masking signal, and a logical calculation step of performing logical calculation to the image signal and the masking signal generated in said masking signal generation step.

18. A method according to claim 15, wherein said recording step comprises a step of scanning a laser beam generated by a semiconductor laser, and a detection step of detecting the laser beam scanned in said scanning step.

19. A method according to claim 18, wherein said masking step masks the laser beam in a main scanning direction and a sub scanning directions of the laser beam.

20. A method according to claim 18, wherein said masking step controls masking in a main scanning direction on the basis of a detection signal in said detection step.

* * * * *

UNITED STATES PATENT AND TRADEMARK OFFICE
CERTIFICATE OF CORRECTION

| | |
|---|---|
| PATENT NO. | : 7,161,704 B1 |
| APPLICATION NO. | : 09/697499 |
| DATED | : January 9, 2007 |
| INVENTOR(S) | : Junichi Kimizuka et al. |

It is certified that error appears in the above-identified patent and that said Letters Patent is hereby corrected as shown below:

COLUMN 5
    Line 43, "shows" should be deleted.

COLUMN 7
    Line 63, "an" should read --a--.

COLUMN 8
    Line 5, "being" should be deleted.

COLUMN 13
    Line 35, "directions" should read --direction--.

COLUMN 14
    Line 20, "recoding" should read --recording--;
    Line 23, "a base" should be deleted; and
    Line 50, "directions" should read --direction--.

Signed and Sealed this

Fourteenth Day of August, 2007

JON W. DUDAS
*Director of the United States Patent and Trademark Office*